US009995620B2

(12) United States Patent
Morimoto et al.

(10) Patent No.: US 9,995,620 B2
(45) Date of Patent: Jun. 12, 2018

(54) COMBINATION SCALE WITH SHIELDING TOOL (71) Applicant: YAMATO SCALE CO., LTD., Akashi-shi, Hyogo (JP)

(72) Inventors: Koji Morimoto, Akashi (JP); Ryo Shimizu, Akashi (JP)

(73) Assignee: Yamato Scale Co., Ltd., Hyogo (JP)

( * ) Notice: Subject to any disclaimer, the term of this patent is extended or adjusted under 35 U.S.C. 154(b) by 189 days.

(21) Appl. No.: 15/182,777

(22) Filed: Jun. 15, 2016

(65) Prior Publication Data
US 2016/0370222 A1 Dec. 22, 2016

(30) Foreign Application Priority Data

Jun. 17, 2015 (JP) ................. 2015-122013

(51) Int. Cl.
G01G 13/16 (2006.01)
G01G 19/393 (2006.01)
G01G 13/00 (2006.01)
G01G 21/00 (2006.01)
G01G 21/30 (2006.01)

(52) U.S. Cl.
CPC ......... G01G 19/393 (2013.01); G01G 13/003 (2013.01); G01G 13/16 (2013.01); G01G 21/00 (2013.01); G01G 21/30 (2013.01)

(58) Field of Classification Search
CPC .... G01G 13/003; G01G 13/022; G01G 13/16; G01G 19/393; G01G 21/00; G01G 21/23; G01G 21/30
See application file for complete search history.

(56) References Cited

U.S. PATENT DOCUMENTS

| 3,848,688 A | * | 11/1974 | Kloppenstein | G01G 21/30 177/179 |
| 4,483,462 A | * | 11/1984 | Heintz | G01G 13/16 141/87 |
| 4,569,405 A | * | 2/1986 | Oshima | G01G 19/393 177/25.18 |
| 5,038,875 A | * | 8/1991 | Kitagawa | G01G 19/393 177/180 |

(Continued)

FOREIGN PATENT DOCUMENTS

WO 2006057164 6/2006

Primary Examiner — Natalie Huls
(74) Attorney, Agent, or Firm — Norris McLaughlin & Marcus, P.A.

(57) ABSTRACT

This disclosure provides a combination scale including a dispersing feeder, linear feeders, a plurality of hoppers, and a collector. The dispersing feeder and linear feeders are respectively disposed in upper parts of a center base of the combination scale to disperse and deliver outwardly articles received therein. The hoppers are removably mountable to an outer periphery of the center base to hold and discharge the articles. The collector collects the articles discharged from the hoppers on a central side of the center base and discharges the collected articles. The collector constitutes a collecting and discharging channel for the articles to be collected and discharged. The combination scale further includes a shielding tool configured to block liquid that drops from the center base downward into the collecting and discharging channel.

8 Claims, 8 Drawing Sheets (56) References Cited

U.S. PATENT DOCUMENTS

| | | | | |
|---|---|---|---|---|
| 6,753,484 B1* | 6/2004 | Widmer | ............... | G01G 13/026 |
| | | | | 177/180 |
| 2016/0362241 A1* | 12/2016 | Morimoto | ............ | G01G 13/022 |
| 2017/0229262 A1* | 8/2017 | Horitani | ................ | H01H 23/06 |

* cited by examiner

COMBINATION SCALE WITH SHIELDING TOOL

BACKGROUND OF THE INVENTION

This invention relates to a combination scale configured to weigh and discharge a predetermined quantity of articles including various kinds of foodstuffs.

Conventionally, combination scales, a typical example of which is described in the patent literature 1, may be structurally and technically characterized as below. The combination scale has, in an upper part of its center base, a dispersing feeder configured to radially disperse and deliver articles received from a device upward, and a plurality of linear feeders configured to deliver outwardly the articles dispersed in and delivered from the dispersing feeder. The combination scale further includes hoppers disposed circumferentially around the center base; a plurality of feeding hoppers, a plurality of weighing hoppers, and a plurality of memory hoppers. The feeding hoppers hold the articles received from the linear feeders and open their gates to discharge the articles downward. The weighing hoppers hold and weigh the articles discharged from the feeding hoppers and open their gates to discharge the articles downward. The memory hoppers hold the articles discharged from the weighing hoppers and open their gates to discharge the articles downward. All of the hoppers may be removably mountable to the center base.

Such a combination scale executes combinatorial computations based on weights of the articles held in the weighing hoppers and weights of the articles held in the memory hoppers to select a combination of hoppers containing the articles of a total weight that falls within a predetermined range of weights. The combination scale then opens the gates of the selected hoppers to discharge the articles. The discharged articles are thrown into collecting chutes and then into collecting funnels to be collected on a central side of the center base. The collected articles are finally guided to and thrown into a packaging machine.

Among the prior art is PCT domestic re-publication WO 2006/057164.

SUMMARY OF THE INVENTION

Mechanical apparatuses for food processing, including combination scales used to weigh and combine food, may have sections conventionally termed as "product zone" and "non-product zone". The product zone refers to sections in contact with food, while the non-product zone refers to sections that make no contact with food. The product zone in contact with food may be buffed for smooth mirror finish, so that the growth of various germs and bacteria is suppressed. On the other hand, such a treatment as buffing is not a requirement for the non-product zone that stays out of contact with food.

In a combination scale for food applications, for example, front surfaces of members in contact with supplied food articles may be conventionally buffed for smooth mirror finish, which include the dispersing tray of the dispersing feeder, the delivery troughs of the linear feeders, the hoppers, and the collecting chutes. On the other hand, no particular polishing treatment is required of the center base that makes no contact with food, including drive units installed in the center base to drive the hopper gates to open and close.

In case of such a combination scale for food applications, the dispersing tray of the dispersing feeder, the delivery troughs of the linear feeders, the hoppers, and other members may be often removed from the center base for cleaning of the center base and these members. In order to save cleaning-related downtime and/or other reasons, the hoppers and other members are possibly remounted to the cleaned center base not fully dried yet.

In such a case, there is a concern that liquid droplets, such as cleaning water, adhering to and left undried on the unpolished center base and the drive units installed in the center base may flow into the hoppers and the collecting chutes disposed downward. Since these hoppers and collecting chutes are places where articles contact, this may be a problem from a hygienic point of view.

The liquid droplets flowing out of the non-product zone may possibly contain foreign substances that are hygienically unacceptable.

In combination scales in which foodstuffs are processed, it is desirable to polish, as well as the product zone making contact with the articles, the non-product zone making no contact with the articles.

The center base included in the non-product zone is large-sized and has a large surface area. The drive units having the hoppers mounted thereto generally have intricate shapes. It is a time-consuming and laborsome work to polish all of these structural elements, demanding higher production costs.

To address these issues, this invention is directed to providing a combination scale excelling in hygiene and inexpensively producible.

To this end, the invention is characterized as hereinafter described.

1) This invention provides a combination scale, including:

a dispersing feeder disposed in an upper central part of a center base and configured to disperse and deliver outwardly articles supplied thereto;

a plurality of linear feeders disposed in an upper part of the center base and configured to deliver further outwardly the articles dispersed and delivered by the dispersing feeder;

a plurality of hoppers removably mounted to an outer periphery of the center base and configured to hold and discharge the articles; and a collector configured to collect the articles discharged from the hoppers on a central side of the center base and then discharge the articles, wherein the collector constitutes a collecting and discharging channel for the articles discharged from the hoppers to be collected and discharged, and the combination scale further includes a shielding tool configured to block liquid that drops from the center base downward into the collecting and discharging channel.

The hoppers and/or other members mounted to the center base may be removed for cleaning of the center base and these members. After the cleaning is done, the removed members, such as the hoppers, may possibly be remounted to the center base not fully dried yet to start the operation sooner. This may involve the risk that liquid adhering to and left undried on the center base, such as cleaning water, flows downward. Yet, the shielding tool provided by this invention may block the liquid to prevent it from flowing into the article collecting and discharging channel.

This may prevent the liquid adhering to and left undried on the center base, i.e., non-product zone, from flowing into the article collecting and discharging channel, i.e., product zone.

The center base is large in size and surface area, and includes intricately-shaped parts. According to this invention, no polishing treatment is required of the surface of such a center base difficult to handle.

2) In preferred aspects of this invention, the shielding tool blocks liquid that drops from the center base downward into the hoppers.

The center base reduced in outer diameter progressively downward, for example, may pose the risk that liquid, such as cleaning water, drops downward from the outer-peripheral upper side of the center base into the hoppers located on the outer-peripheral lower side of the center base. According to the above-described aspects of this invention, the shielding tool may prevent the liquid adhering to and left on the center base from flowing into the hoppers located at positions on the lower side of the center base.

3) In some other aspects of this invention, the hoppers include:

a plurality of feeding hoppers configured to hold and discharge the articles delivered by the linear feeders;

a plurality of weighing hoppers configured to weigh the articles discharged from the feeding hoppers; and a plurality of memory hoppers configured to hold and discharge the articles discharged from the weighing hoppers, wherein the memory hoppers are mounted at positions nearer to the center base than the weighing hoppers, and the shielding tool includes a shielding member configured to block liquid that drops from the outer periphery of the center base downward into the memory hoppers.

The weighing hoppers are mounted on the upper side of the center base than the memory hoppers. Due to the fact, liquid such as cleaning water, if left at parts of the center base mounted with the weighing hoppers, possibly drops downward into the memory hoppers. According to the above-described aspects of this invention, however, the shielding tool may prevent the liquid from flowing into the memory hoppers.

4) In some other aspects of this invention, the collector includes:

a collecting chute configured to collect the articles discharged from the weighing hoppers and the memory hoppers on the central side of the center base; and a collecting funnel configured to collect the articles received from the collecting chute on the central side of the center base and discharge the articles, wherein the shielding member of the shielding tool configured to block the liquid that drops into the memory hoppers is an upper shielding member, and the shielding tool further includes a lower shielding member configured to block liquid that drops from the outer periphery of the center base downward into the collecting and discharging channel.

According to the above-described aspects of this invention, liquid, such as cleaning water, left on the outer periphery of the center base and possibly dropping downward may be blocked by the lower shielding member. This may prevent the liquid from flowing into the article collecting and discharging channel formed by the collecting chute and the collecting funnel.

5) In preferred aspects of this invention, the upper shielding member guides the liquid received therein to flow downward to the lower shielding member.

According to the above-described aspects of this invention, the liquid received by the upper shielding member is guided to merge into the liquid directly received by the lower shielding member.

6) In some other aspects of this invention, the shielding tool further includes a central shielding member configured to block liquid that drops downward from an outer bottom surface of the center base, wherein the central shielding member guides the liquid received therein to flow downward to the lower shielding member.

Liquid, such as cleaning water, adhering to and left on the outer bottom surface of the center base when cleaning may drop downward. Liquid from the outer periphery of the center base may travel around the outer bottom surface of the center base and then drop downward. According to the above-described aspects of this invention, however, the dropping liquid is once received by the central shielding member and then guided to flow downward to the lower shielding member. The liquid, if dropping from the outer bottom surface of the center base, may be thereby prevented from flowing into the article collecting and discharging channel.

7) In some other aspects of this invention, the center base is coupled to and supported by a base with support legs located at a plurality of positions along the circumferential direction thereof, the lower shielding member is laid between the support legs and includes a discharge trough configured to receive the liquid discharged downward from the lower shielding member, and the discharge trough is located at a position on the lower side of the support legs so as to incline downward toward outside.

According to the above-described aspects of this invention, a space on the lower side of the support legs may be effectively used for a discharge channel to be formed, and the liquid collected by the lower shielding member may be easily discharged outwardly through the discharge channel.

According to this invention described thus far, the shielding tool may advantageously prevent that liquid, such as cleaning water, adhering to and left undried on the center base, i.e., non-product zone, flows into the article collecting and discharging channel, i.e., product zone. Therefore, no costly or laborsome polishing treatment is required of the center base, and a combination scale that excels in hygiene may be inexpensively producible.

DETAILED DESCRIPTION OF THE INVENTION

Hereinafter, a combination scale according to an embodiment of the invention, is described in detail referring to the accompanying drawings.

Figure 1:
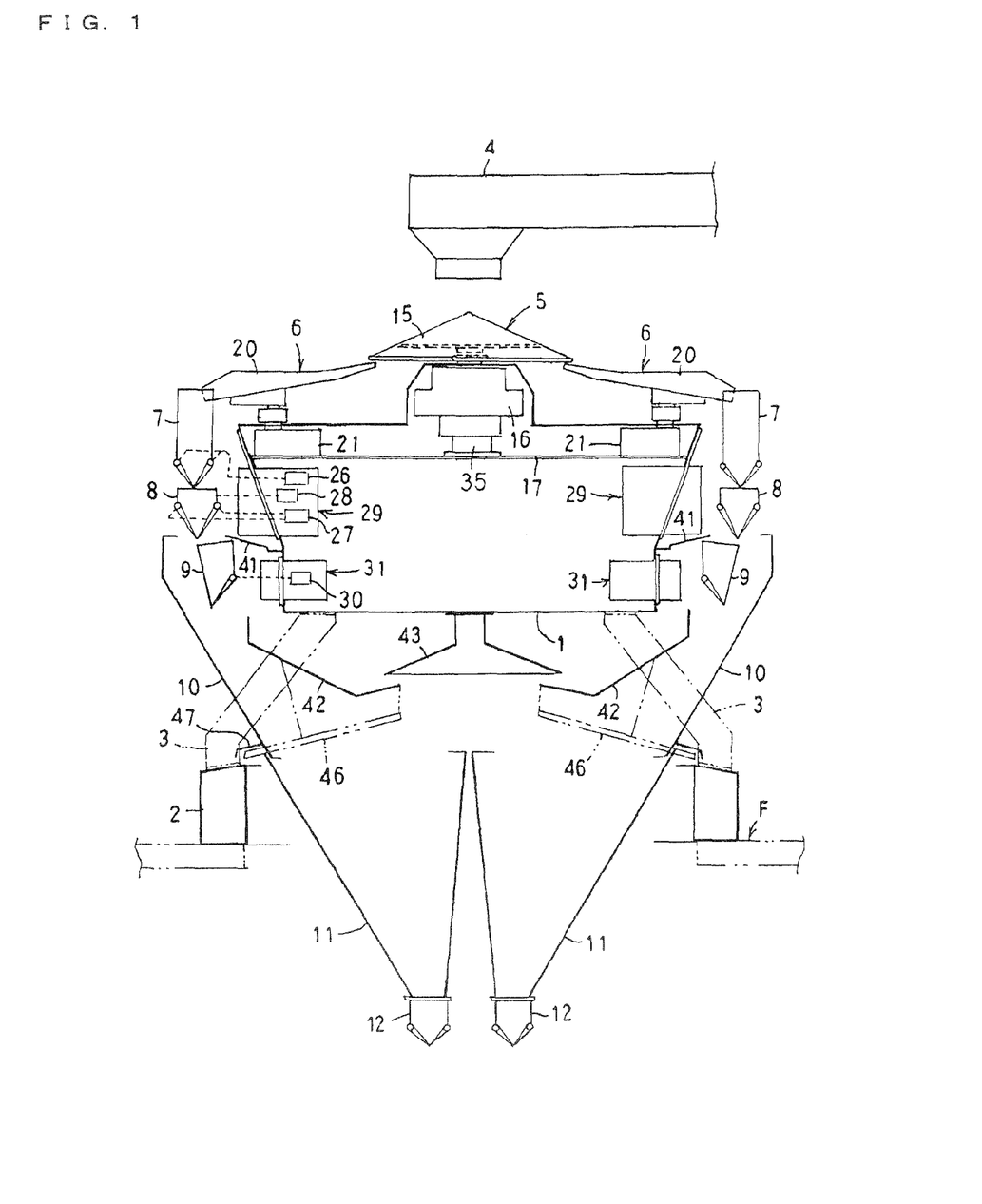
FIG. 1 is a longitudinal front view, schematically illustrating a combination scale according to an embodiment of the invention.
Figure 2:
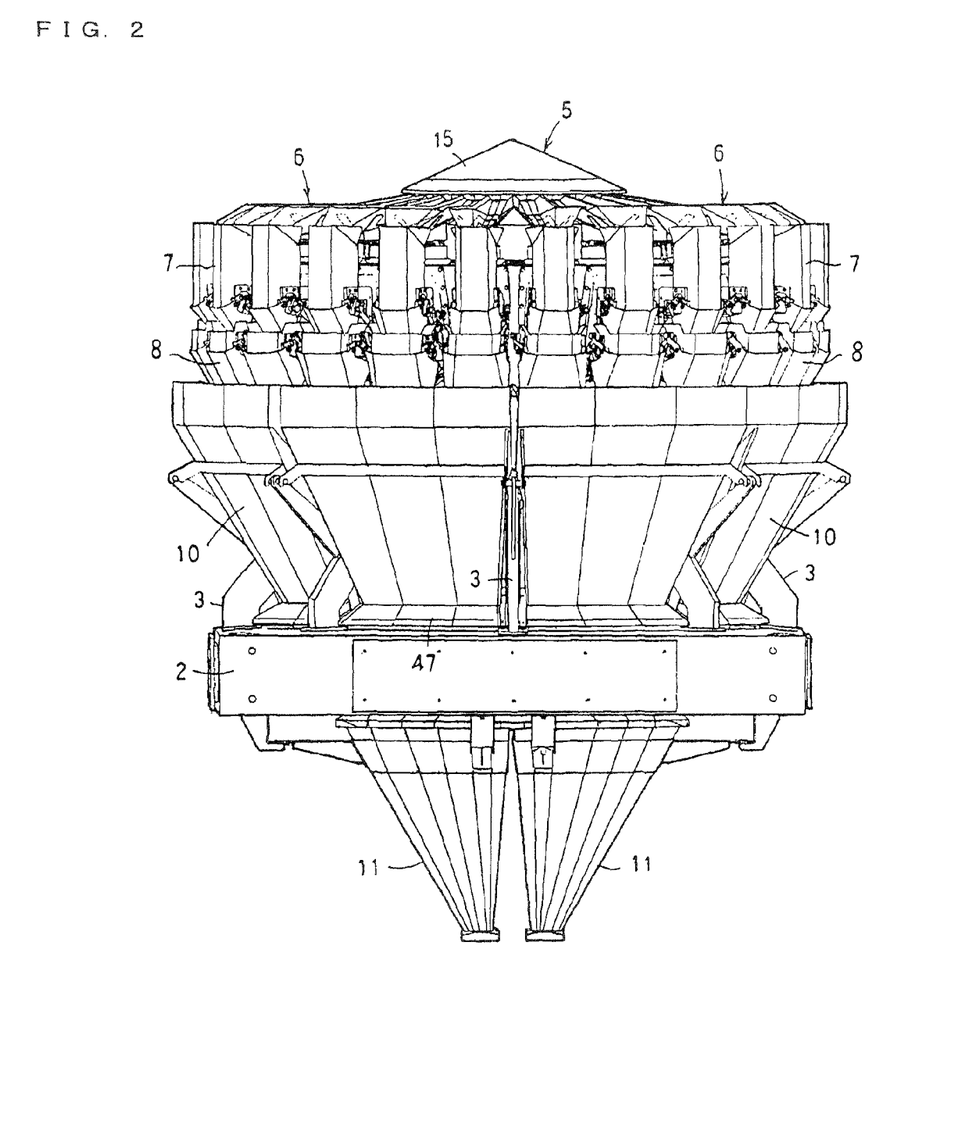
FIG. 2 is a front view of the combination scale illustrated in FIG. 1.
Figure 3:
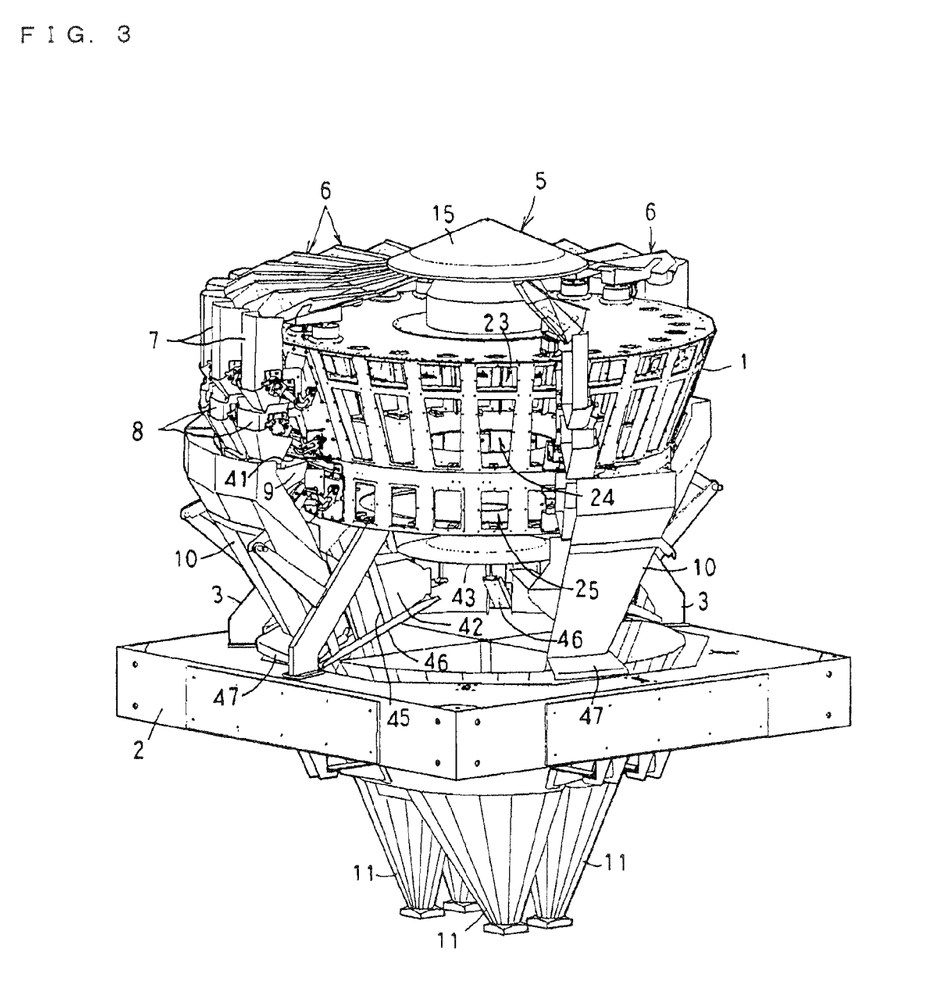
FIG. 3 is a perspective view of the combination scale from which its structural elements on its front side have partly been removed.
Figure 4:
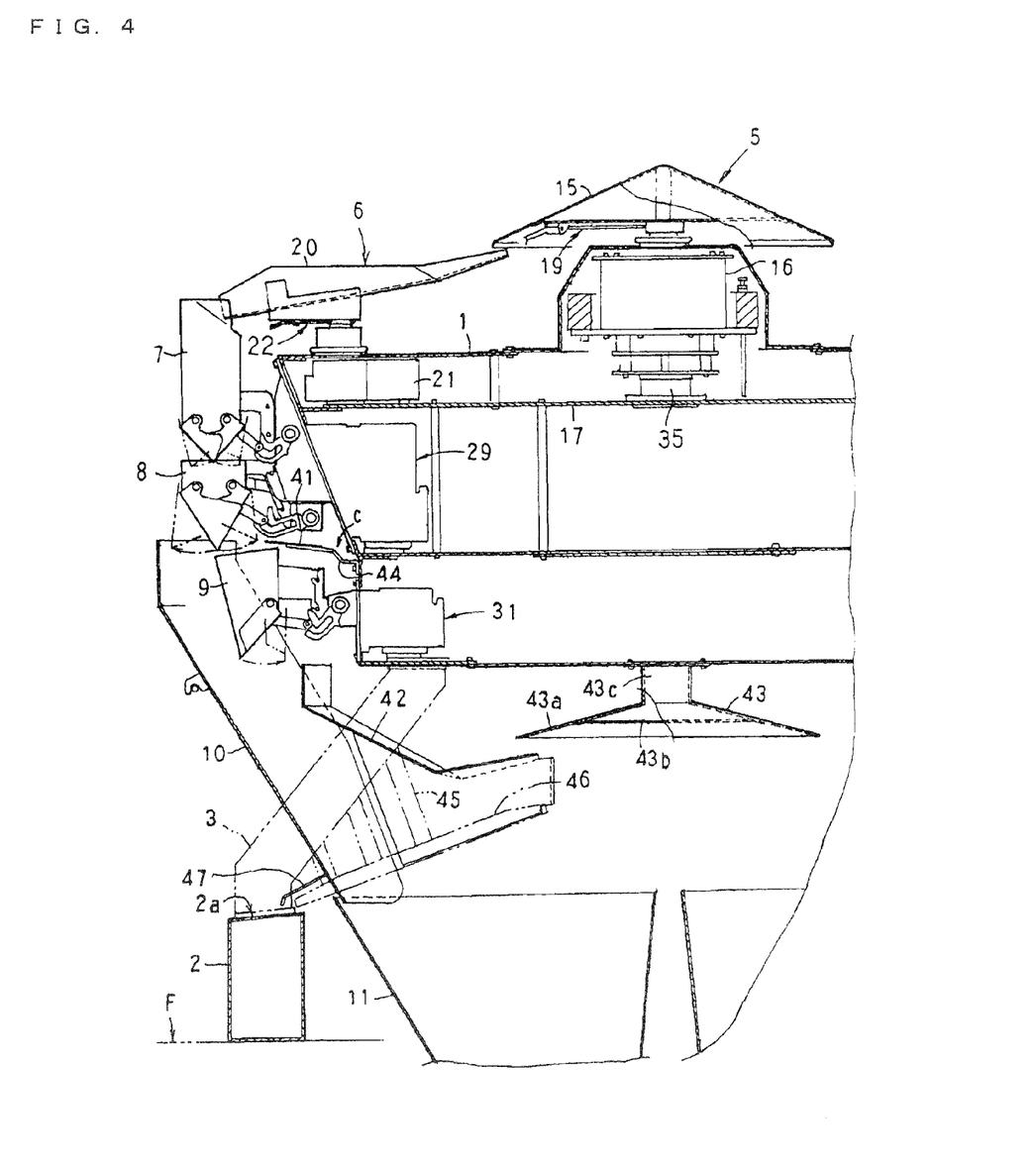
FIG. 4 is a longitudinal front view of main structural elements of the combination scale.

FIG. 1 is a longitudinal front view, schematically illustrating the combination scale according to the embodiment. FIG. 2 is a front view of the combination scale illustrated in FIG. 1. FIG. 3 is a perspective view of the combination scale from which its structural elements on its front side have partly been removed. FIG. 4 is a longitudinal front view of main structural elements of the combination scale.

The combination scale according to this embodiment is for use in, for example, a packaging line on which a predetermined quantity of articles to be weighed, typically, food including candies and snacks, are weighed and thrown into a packaging machine, not illustrated in the drawings, to be packed in bags.

The combination scale has, at its center, a center base 1 having a hollow columnar shape. The center base 1 is supported by a rectangular base 2 with a plurality of support legs 3 interposed therebetween. The base 2 has, at its center part, a large opening vertically penetrating therethrough. The base 2 is securely situated on a floor surface F.

A dispersing feeder 5 is mounted to an upper part of the center base 1. The dispersing feeder 5 radially disperses, by way of vibrations, the articles dropping downward through an end port of a feeder 4 illustrated in FIG. 1. A plurality of linear feeders 6 is radially disposed around the dispersing feeder 5. The linear feeders 6 respectively receive the articles dispersed and thrown therein and linearly deliver the articles outwardly by way of vibrations. There are hoppers on an outer periphery of the center base 1; feeding hoppers 7, weighing hoppers 8, and memory hoppers 9. The feeding hoppers 7 temporarily store therein the articles received from the linear feeders 6 and open their gates to discharge the articles. The weighing hoppers 8 weigh the articles discharged from the feeding hoppers 7 and open their gates to discharge the articles. The memory hoppers 9 temporarily store therein the articles weighed by the weighing hoppers 8 and then open their gates to discharge the weighed articles. These hoppers are removably mountable to the center base 1. The weighing, combinatorial computations, and discharge of the articles are carried out by multiple weighing modules (24 modules in this example) each consisting of a set of one linear feeder 6, feeding hopper 7, weighing hopper 8, and memory hopper 9.

In the illustrated example, of the multiple weighing modules (24 modules), one-quarter modules (six modules); four weighing systems in total, independently carry out the weighing, combinatorial computations, and discharge of the articles.

There are collecting chutes 10 below the weighing hoppers 8 and the memory hoppers 9. The collecting chutes 10 collect the articles discharged from plural ones of the weighing hoppers 8 selected by the combinatorial computations as a combination of weigh hoppers having a total weight that falls within a predetermined range of weights, or collect the articles discharged from the memory hoppers 9. There are collecting funnels 11 (four collecting funnels in this example) below the collecting chutes 10. The collecting funnels 11 collect the articles dropping downward from the collecting chutes 10. At lower ends of the collecting funnels 11 are disposed collecting hoppers 12, as illustrated in FIG. 1. The collecting hoppers 12 receive and temporarily store therein the articles collected in the collecting funnels 11. The gates of the collecting hoppers 12 are opened in response to the receipt of a discharge request command outputted from the packaging machine.

The collecting chute 10 and the collecting funnel 11 constitute a collector. The collector collects, on a central side of the center base 1, the articles discharged from the weighing hoppers 8 and the memory hoppers 9. The collector then discharges the collected articles. The inner peripheral surfaces of the collecting chute 10 and the collecting funnel 11 constitute a collecting and discharging channel. By way of the collecting and discharging channel, the articles from the hoppers 8 and 9 are collected, guided, and discharged.

Like the collecting chutes 10, the collecting funnels 11 collect the articles on the central side of the center base 1 and guide them downward. The collecting funnel may be otherwise termed as a collecting chute. In this embodiment, the collector includes upper and lower collecting chutes in two stages; collecting chute 10 on the upper side and the collecting funnel 11, or collecting chute, on the lower side. The collector may consist of a single collecting chute or may consist of collecting chutes provided in three or more stages.

Figure 5:
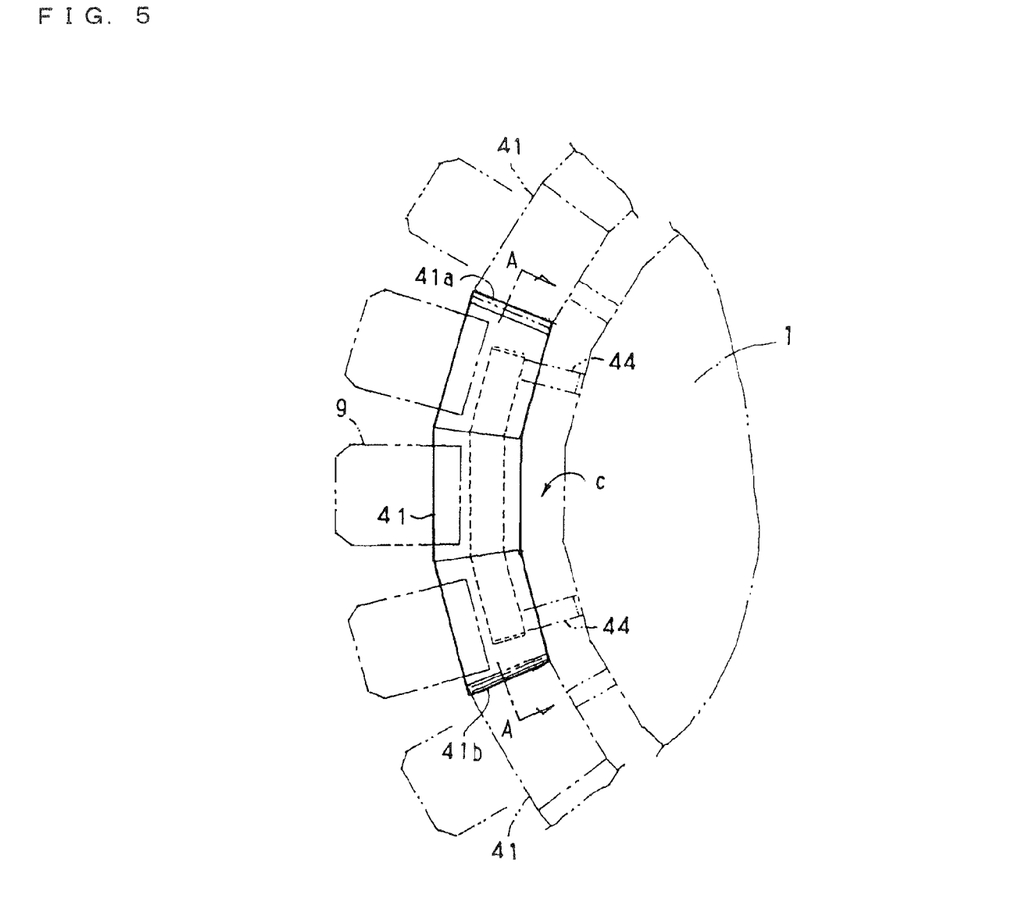
FIG. 5 is a plan view of an upper shielding member.

As illustrated in FIGS. 4 and 5, the dispersing feeder 5 includes a conically-shaped dispersing tray 15 and an electromagnetic vibration generator 16 that vibrates the dispersing tray 15. The vibration generator 16 is located at the center on a support frame 17 arranged inside the center base 1. The vibration generator 16 of the dispersing feeder 5 is coupled to and supported by a weight sensor 35 set on the support frame 17. The weight sensor 35 detects the weight of articles held in the dispersing feeder 5. The detected information is inputted to a controller not illustrated in the drawings. The controller, based on the detected information, turns on or off the feeder 4, thereby constantly feeding the dispersing feeder 5 with the articles of a weight that falls within a predetermined range of weights.

Figure 11:
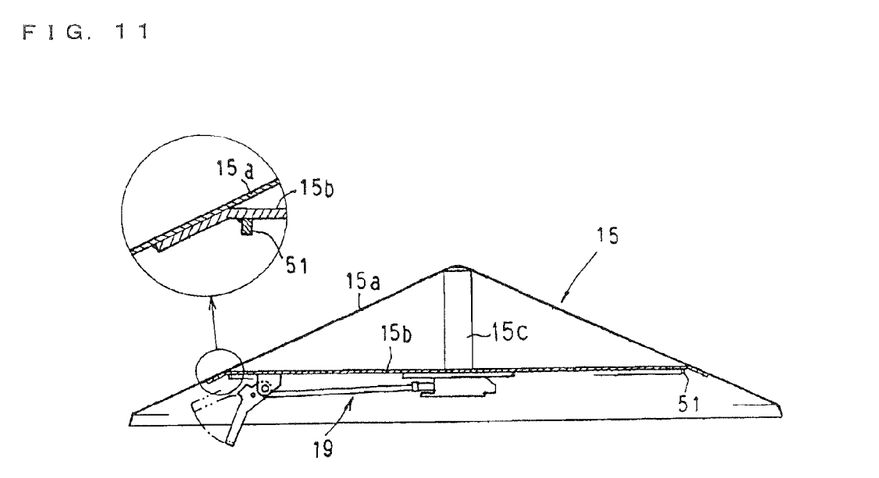
FIG. 11 is a longitudinal cross-sectional view of a dispersing tray.
Figure 12:
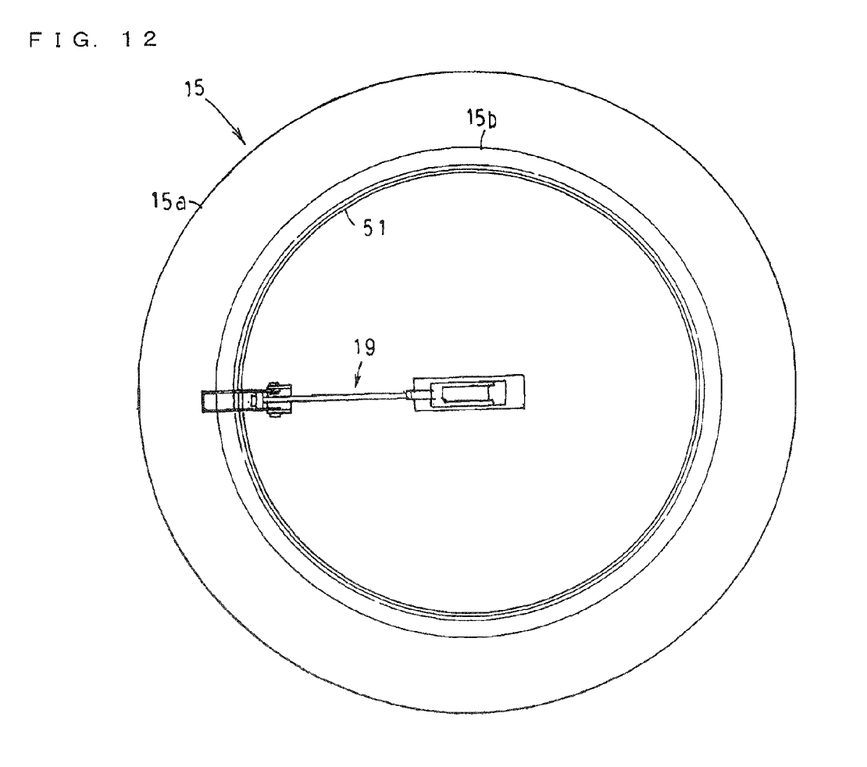
FIG. 12 is a bottom view of the dispersing tray.

As illustrated in FIGS. 11 and 12, the dispersing tray 15 includes a tray body 15a formed of a conically-shaped thin plate member, and a disc-shaped reinforcing plate 15b formed of a plate member thicker than the tray body 15a, wherein the reinforcing plate 15b is welded and fixed to the back-surface side of the tray body 15a along its whole circumference. A columnar support 15c is standing upright at the center on the upper surface of the reinforcing plate 15b, and an upper end of the columnar support 15c and a top part of the tray body 15a are welded to each other. On the lower surface of the reinforcing plate 15 is disposed a buckle-type coupling mechanism 19 that allows the dispersing tray 15 to be removably coupled to an upper-end head of the vibration generator 16.

As illustrated in FIGS. 1 and 4, the linear feeders 6 each include a delivery trough (feeder pan) 20 having a groove extending in an inward-outward direction, and an electromagnetic vibration generator 21 that vibrates the delivery trough 20. The vibration generator 21 of each linear feeder 6 is attached to the support frame 17 so as to surround the vibration generator 16 of the dispersing feeder 5. The delivery trough 20 is mountable to and removable from the vibration head unit of the vibration generator 21 by operating the lever of a buckle-type coupling mechanism 22 on the back-surface side of the delivery trough 20 illustrated in FIG. 4.

As illustrated in FIG. 3, the outer peripheral surface of the center base 1 has mounting openings 23, 24, and 25 formed in vertically three different stages for each of the weighing modules. Referring to FIGS. 1 and 4, the mounting opening 28 in the upper stage is used for the vibration generator 21 of the linear feeder 6 to be inserted in and mounted to the center base 1. The mounting opening 24 in the middle stage is used for a drive unit 29 to be inserted in and mounted to the center base 1. In the drive unit 29 are housed motors 26 and 27 that drive the gates of the feeding hopper 7 and the weighing hopper 8 to open and close, and a weight sensor 28 that weighs the articles in the weighing hopper 8. The feeding hoppers 7 and the weighing hoppers 8 are removably mounted with hooks to and thereby supported by outwardly exposed parts of the drive units 29 out of the center base 1. The mounting opening 25 in the lower stage is used for a drive unit 31 to be inserted in and mounted to the center base 1. In each of the drive units 31 is housed a motor 30 that drives the gate of the memory hopper 9 to open and close. The memory hoppers 9 are removably mounted with hooks to and thereby supported by outwardly exposed parts of the drive units 29 out of the center base 1.

By coupling the feeding hopper 7 and the weighing hopper 8 to the drive unit 29, gate opening-closing linkage mechanisms of the feeding hopper 7 and the weighing hopper 8 are engageably coupled to a motor-driven drive arm of the drive unit 29. By coupling the memory hopper 9 to the drive unit 31, a gate opening-closing linkage mechanism of the memory hopper 9 is engageably coupled to a motor-driven drive arm of the drive unit 31. These coupling structured are, however, not illustrated in the drawings.

In case liquid, such as cleaning water, adheres to and is left on the peripheral part of the center base 1 when cleaning, the liquid may flow into places where articles contact, such as the memory hopper 9, and/or the article collecting and discharging channel formed by the collecting chute 10 and the collecting funnel 11. To avoid that, the combination scale according to this embodiment is equipped with a shielding tool that blocks such inflow of the liquid.

As illustrated in FIGS. 1, 3, and 4, the shielding tool according to this embodiment includes upper shielding members 41, lower shielding members 42, and central shielding members 43. The upper shielding member 41 blocks the liquid droplets, such as cleaning water, which adheres to and remains on the part of the drive unit 29 exposed out of the center base 1 to prevent them from dropping onto and flowing into the memory hopper 9. The lower shielding member 42 blocks the liquid droplets dropping downward from the outer periphery of the center base 1 to prevent them from flowing into the article collecting and discharging channel formed by the collecting chute 10 and the collecting funnel 11. The central shielding member 43 blocks the liquid droplets dropping downward from the outer bottom surface of the center base 1 to prevent them from flowing into the article collecting and discharging channel formed by the collecting chute 10 and the collecting funnel 11. The shielding members 41, 42, and 43 are made of a stainless steel and structured as described below.

[Upper Shielding Member 41]

The upper shielding member 41 is a thin plate member in the form of an unfolded fan in plan view. As illustrated in FIGS. 4 and 5, the plural upper shielding members 41 are annularly disposed circumferentially around the center base 1 with an interval c from the outer periphery of the center base 1. By using a support stay 4, the upper shielding member 41 is coupled to and supported by the outer peripheral surface of the center base 1 so as to incline slightly upward toward outside.

As illustrated in FIG. 5, each one of the upper shielding members 41 is provided for three of the circumferentially adjacent memory hoppers 9. In the illustrated example having 24 weighing modules in total, eight upper shielding members 41 in total are annularly surrounding the center base 1. The upper shielding members 41 are located so as to partly overlap with the openings of the memory hoppers 9 to stay out of a passage in which the articles transferred from the weighing hoppers 8 to the memory hoppers 9 may be dropped.

Figure 6:
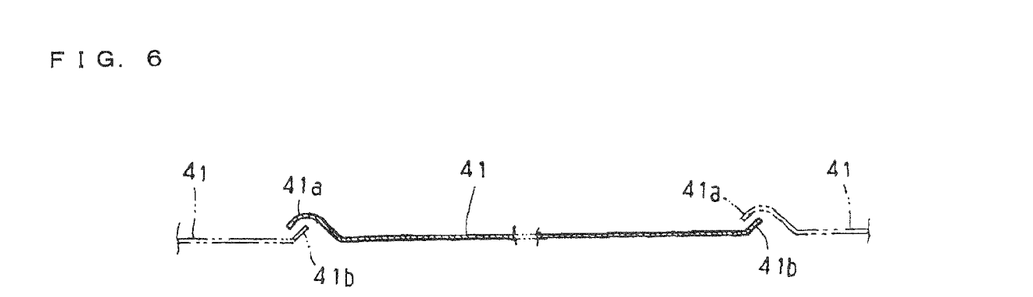
FIG. 6 is an A-A cross-sectional view of FIG. 5.

Referring to FIG. 6 illustrating an A-A cross-sectional view of FIG. 5, the upper shielding members 41 each have a mountain-like curved end side 41a at circumferential one end thereof, and an upright end side 41b at circumferential another end thereof. By overlaying the curved end sides 41a on the upright end sides 41b of the adjacent upper shielding members 41, the liquid flowing on the upper shielding members 41, instead of leaking through any gap between the upper shielding members 41, may be directed toward the center base 1.

The liquid droplets adhering to and left on the part of the drive unit 29 exposed out of the center base 1 may possibly drop. Yet, the liquid droplets may be received by the upper shielding member 41, and guided to flow downward through the interval c between the upper shielding member 41 and the outer periphery of the center base 1. The liquid droplets may be thus prevented from flowing into the memory hoppers 9.

[Lower Shielding Member 42]

The lower shielding members 42 are laid between adjacent ones of the support legs 3 supporting the center base 1. In the illustrated example, the lower shielding members 42 are located between adjacent ones of the support legs 3 at eight positions circumferentially spaced at an equal pitch.

Figure 7:
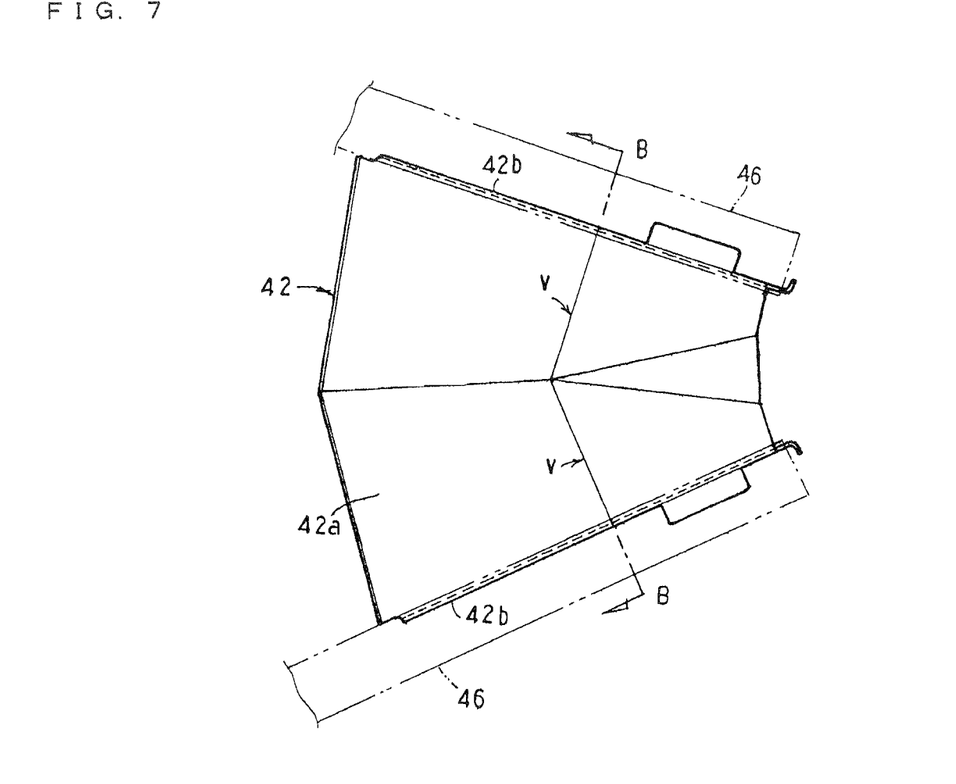
FIG. 7 is a plan view of a lower shielding member.
Figure 8:
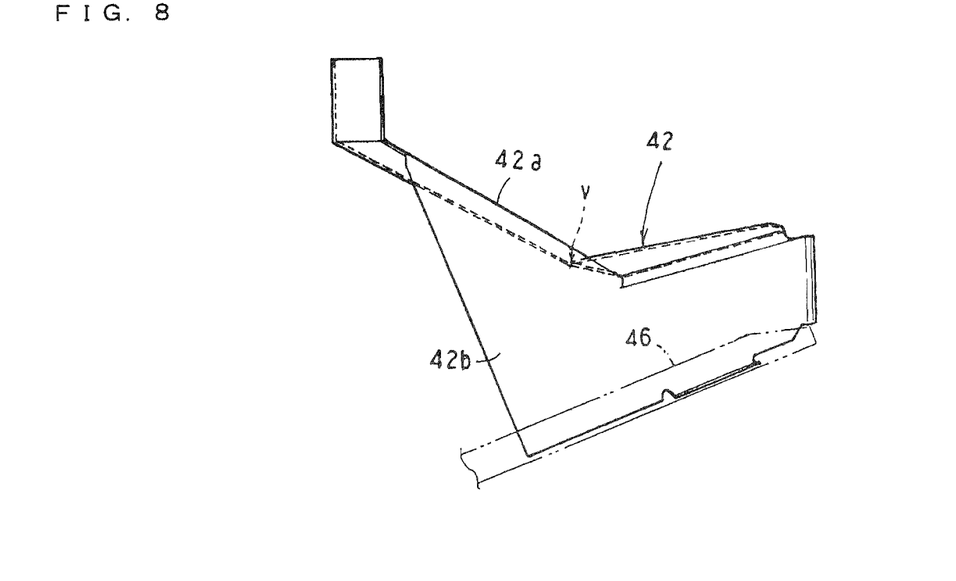
FIG. 8 is a side view of the lower shielding member.
Figure 9:
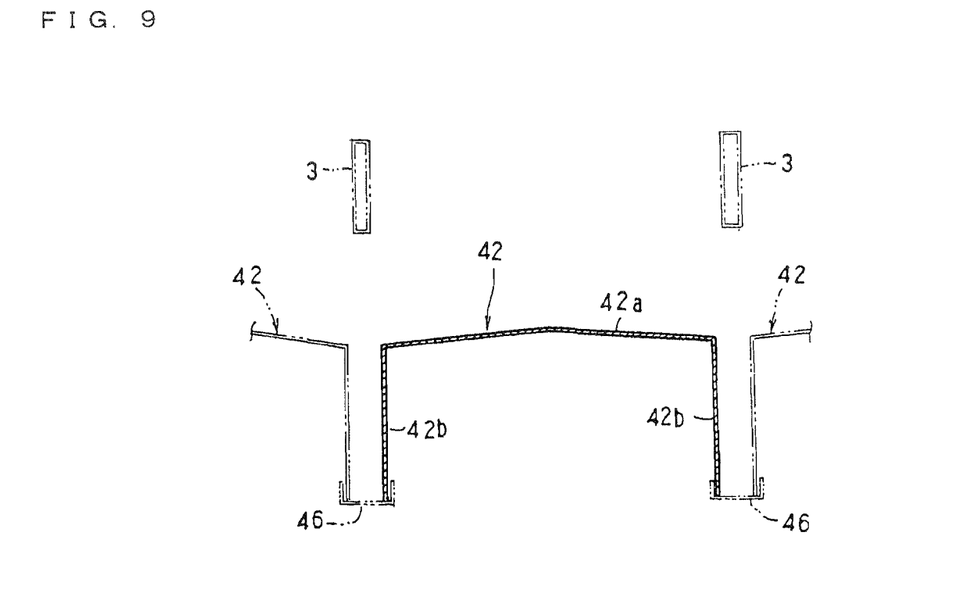
FIG. 9 is a B-B cross-sectional view of FIG. 7.
Figure 10:
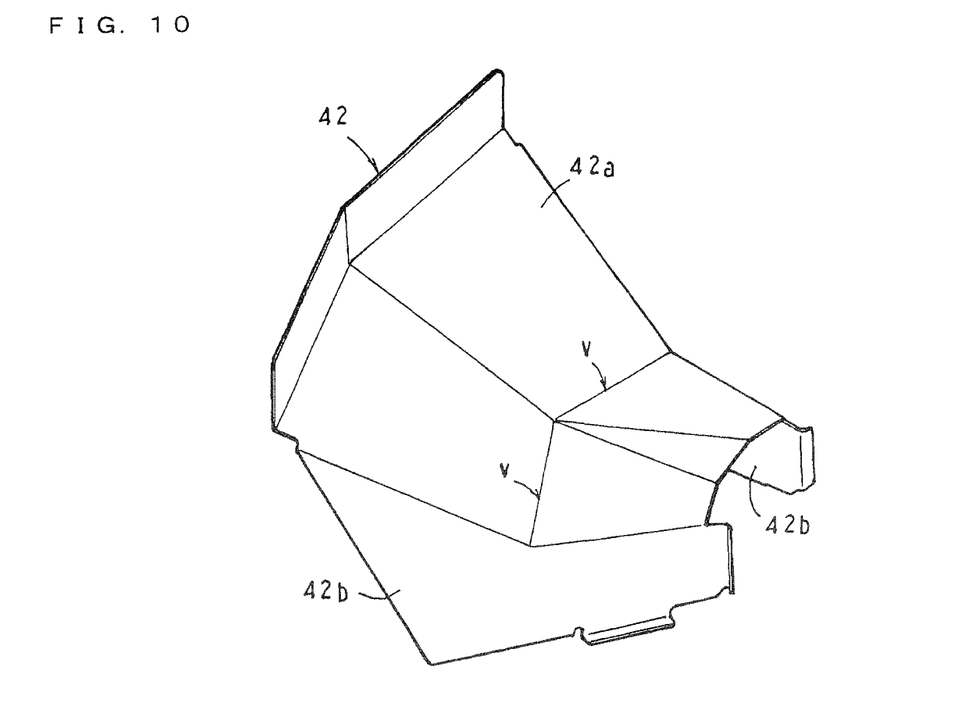
FIG. 10 is a perspective view of the lower shielding member.

FIG. 7 is a plan view of the lower shielding member 42. FIG. 8 is a side view of the lower shielding member 42. FIG. 9 is a B-B cross-sectional view of FIG. 7. FIG. 10 is a perspective view of the lower shielding member 42.

As illustrated in these drawings, the lower shielding members 42 each has a top plate 42a and a pair of side plates 42b. The top plate 42a is a liquid receiver in the form of an unfolded fan in plan view. The side plates 42 are extending downward in a bending shape from circumferential two ends of the top plate 42a. The top plate 42a is bent in a side view, as in a valley, at a middle position in the inward-outward direction, and is inclined downward toward the circumferential outer end sides.

As illustrated in FIGS. 3 and 4, discharge troughs 46 for discharging liquid such as water are supported at lower ends of support stays 45 extending downward from the support legs 3 supporting the center base 1. The discharge trough 46 is supported, being inclined downward toward outside along the lower ends of the side plates 42b of the lower shielding member 42. The outer end of the discharge trough 46 is facing the upper surface of the base 2 inclined downward toward outside.

The liquid droplets of, for example, cleaning water adhering to and left on the part of the drive unit 31 exposed out of the center base 1, and/or, the liquid droplets received by the upper shielding member 41 possibly drop downward. Yet, the dropping liquid droplets may be received by the top plate 42a of the lower shielding member 42 and then collected in a valley part v formed in the middle in the inward-outward direction. Thus, the liquid droplets may be prevented from flowing into the article collecting and discharging channel formed by the collecting chute 10 and the collecting funnel 11.

The liquid collected in the valley part v of the lower shielding member 42 flows circumferentially outward along the valley part v, and then further flows downward along the outer surface of the side plate 42b into the discharge trough 46. The liquid which flowed into the discharge trough 46 is then guided onto the base 2 and discharged outwardly along an inclined upper surface 2a of the base 2.

On the outer surface of each collecting chute 10 is disposed a cover 47 for blocking foreign substances that may enter through an interval between the base 2 and the collecting chute 10.

[Central Shielding Member 43]

As illustrated in FIG. 4, the central shielding member 43 has a body 43a and a reinforcing plate 43b. The body 43a is a thin plate member formed in a tapered cone shape. The reinforcing plate 43b is coupled to the back-surface side of the body 43a. The body 43a has, at its upper central part, a mounting flange-attached boss 43c. The central shielding member 43 is coupled to the center on the bottom surface of the center base 1.

The central shielding member 43 has a diameter that allows an outer peripheral part of the body 43a to overlap with an inner end part of the lower shielding member 42 disposed therebelow. The liquid droplets dropping from the outer bottom surface of the center base 1 are thereby allowed to run downward along the central shielding member 43 and drop on the lower shielding member 43. The liquid droplets dropping on the lower shielding member 43 are then guided to the valley part v of the top plate 42a.

According to this embodiment, when the members such as the hoppers 7 to 9 are remounted to the center base 1 cleaned with liquid, such cleaning water before the center base 1 is fully dried, the liquid adhering to and left on the center base 1 is prevented by the upper shielding member 41, lower shielding member 42, and central shielding member 43 of the shielding tool from flowing into the memory hopper 9 or the article collecting and discharging channel formed by the collecting chute 10 and the collecting funnel 11.

The liquid adhering to and left on the center base 1; non-product zone making no contact with the articles, may be prevented from flowing into the memory hopper 9 or the article collecting and discharging channel formed by the collecting chute 10 and the collecting funnel 1; product zone making contact with food.

The center base is a large-sized member having a large surface area and including intricately shaped parts, for example, drive units 29 and 31. According to this embodiment, unlike the product zone, no polishing treatment is required of the surface of the center base 1 thus difficult to handle. This may allow for low-cost production of combination scales excelling in hygiene.

The dispersing tray 15 of the dispersing feeder 5 is removably mounted to the upper-end head of the vibration generator 16 located at the center on the upper side of the center base 1. The dispersing tray 15 is removable from the upper-end head of the vibration generator 16 for cleaning. In this connection, the dispersing tray 15 cleaned but not fully dried yet is possible remounted to the vibration generator 16 of the center base 1.

The front surface of the dispersing tray; product zone in contact with the articles, may be, for example, buffed for smooth mirror finish.

On the other hand, the back surface of the dispersing tray making no contact with the articles may be left unpolished. In case the cleaned but undried dispersing tray 15 is remounted to the vibration generator 16 of the center base 1, liquid, such as cleaning water, adhering to and left on the back surface of the dispersing tray 15 may flow toward the outer periphery of the dispersing tray 15, possibly dropping from there on the delivery trough 20 of the linear feeder 6; product zone. This should desirably be avoided.

It may be an option to polish the back surface of the dispersing tray 15, although it is a part of the non-product zone, as well as the front surface of the dispersing tray which is a part of the product zone. Further, the back surface with any welded section may be optionally further processed by bead cutting.

A problem with this approach is the coupling mechanism 19 attached to the back surface of the dispersing tray 15. The coupling mechanism 19 is a required element to removably mount the dispersing tray 15 to the vibration generator 16 as described earlier. It is a time-consuming and laborsome work to perform polishing and bead cutting for all of structural elements of the coupling mechanism 19, demanding higher production costs.

In this embodiment, therefore, an annular liquid stopper 51 is formed on the lower surface of the reinforcing plate 15b on the back-surface side of the tray body 15a of the dispersing tray 15, as illustrated in FIGS. 11 and 12. The liquid stopper 51 is protruding from the lower surface so as to surround a region where the coupling mechanism 19 is installed. The liquid stopper 51 is a member in the form of an annularly-arranged vertical wall having a height of approximately several millimeters. This member is formed by welding an angular rod stock toroidally shaped to the lower surface of the reinforcing plate 15b.

The front surface of the tray body 15a and a region from the outer peripheral end of the tray body 15a to the lower end of the liquid stopper 51 are polished by, for example, buffing. A filler-welded section between the tray body 15a and the reinforcing plate 15b, and a filler-welded section between the reinforcing plate 15b and the liquid stopper 51 are processed by bead cutting. On the other hand, the lower surface of the reinforcing plate 15b and the structural elements of the coupling mechanism 19 on the inner side than the liquid stopper 51 are left unpolished.

In case the dispersing tray 15 removed to be cleaned from the vibration generator 16 is remounted, before it is fully dried, to the vibration generator 16, liquid, such as cleaning water, adhering to and left in an inner region than the liquid stopper 51 may start to flow outwardly by way of vibrations. Yet, the liquid stopper 51 serves to block the liquid, guiding the liquid from the lower end of the liquid stopper 51 to drop downward on the center base 1. It is thus prevented that the liquid adhering to and left in the inner region than the liquid stopper 51 flows outward and flow into the delivery trough 20 of the linear feeder 6.

The liquid adhering to and left in the inner region than the liquid stopper 51, i.e., unpolished non-product zone, may be blocked not to reach the polished region on the outer side than the liquid stopper 51. This may eliminate the risk of the liquid flowing into the product zone; delivery trough 20 of the linear feeder 6.

The annular arrangement of the liquid stopper 51 may not necessarily refer to a circular configuration but may refer to a rectangular configuration. The cross-sectional shape of the liquid stopper 51, instead of the shape of an angular rod, may have any suitable shape including an arc shape and a shape having a lower end sharpened like a knife edge.

The liquid on the center base 1 flows downward from the outer periphery of the center base 1 and is guided to flow by the shielding tool as described earlier.

OTHER EMBODIMENTS

This invention may further include other implementations described below.

1) In the embodiment described so far, the shielding tool for blocking the liquid includes three different shielding members; upper shielding members 41, lower shielding members 42, and central shielding members 43. Providing three different shielding members is, however, just an optional structure. The combination scale may be differently configured or the shielding members may be differently shaped, in which case two or less or four or more shielding members may be possible.

In case the combination scale has no memory hopper 9, the upper shielding members 41 that block inflow of the liquid into the memory hoppers 9 may be unnecessary. In this instance, the outer ends of the lower shielding members 42 may be extended to vicinity of the passage for the articles discharged from the weighing hoppers 8 to be dropped. These extended parts may each serve as a receiver for any liquid droplets dropping downward from the parts of the drive units 29 and 31 exposed out of the center base 1.

2) In the embodiment described so far, the liquid travelling along each of the discharge trough 46 flows outwardly along the inclined upper surface 2a of the base 2 to be discharged onto the floor surface F where the base 2 is situated. Instead, the liquid travelling along the discharge trough 46 may be guided to and discharged at a predetermined position, so that the floor surface F is not wetted. For example, a collecting trough for collecting liquid from the discharge troughs 46 may be annularly provided on the upper surface of the base 2, wherein discharge pipes or discharge hoses are connected to discharge ports formed at predetermined positions of the collecting trough. In this instance, the collected liquid may be guided to given positions to be discharged from there or guided into and collected by a container.

The invention claimed is:

1. A combination scale, comprising:
a dispersing feeder disposed in an upper central part of a center base and configured to disperse and deliver outwardly articles supplied thereto;
a plurality of linear feeders disposed in an upper part of the center base and configured to deliver further outwardly the articles dispersed and delivered by the dispersing feeder;
a plurality of hoppers removably mounted to an outer periphery of the center base and configured to hold and discharge the articles; and
a collector configured to collect the articles discharged from the hoppers on a central side of the center base and then discharge the articles, wherein
the collector constitutes a collecting and discharging channel for the articles discharged from the hoppers to be collected and discharged, and
the combination scale further includes a shielding tool configured to block liquid that drops from the center base downward into the collecting and discharging channel.

2. The combination scale as claimed in claim 1, wherein the shielding tool blocks liquid that drops from the center base downward into the hoppers.

3. The combination scale as claimed in claim 2, wherein the hoppers comprise:
a plurality of feeding hoppers configured to hold and discharge the articles delivered by the linear feeders;
a plurality of weighing hoppers configured to weigh the articles discharged from the feeding hoppers; and
a plurality of memory hoppers configured to hold and discharge the articles discharged from the weighing hoppers, wherein
the memory hoppers are mounted at positions nearer to the center base than the weighing hoppers, and
the shielding tool comprises a shielding member configured to block liquid that drops from the outer periphery of the center base downward into the memory hoppers.

4. The combination scale as claimed in claim 3, wherein the collector comprises:
a collecting chute configured to collect the articles discharged from the weighing hoppers and the memory hoppers on the central side of the center base; and
a collecting funnel configured to collect the articles received from the collecting chute on the central side of the center base and discharge the articles, and
the shielding tool comprises, as an upper shielding member, the shielding member configured to block the liquid that drops into the memory hoppers, and further comprises a lower shielding member configured to block liquid that drops from the outer periphery of the center base downward into the collecting and discharging channel.

5. The combination scale as claimed in claim 4, wherein the upper shielding member guides the liquid received therein to flow downward to the lower shielding member.

6. The combination scale as claimed in claim 4, wherein the shielding tool further comprises a central shielding member configured to block liquid that drops downward from an outer bottom surface of the center base, and
the central shielding member guides the liquid received therein to flow downward to the lower shielding member.

7. The combination scale as claimed in claim 5, wherein the shielding tool further comprises a central shielding member configured to block liquid that drops downward from an outer bottom surface of the center base, and
the central shielding member guides the liquid received therein to flow downward to the lower shielding member.

8. The combination scale as claimed in claim 4, wherein the center base is coupled to and supported by a base with support legs being located at a plurality of positions along the circumferential direction thereof,
the lower shielding member is laid between the support legs and includes a discharge trough configured to receive the liquid discharged downward from the lower shielding member, and
the discharge trough is located at a position on the lower side of the support legs so as to incline downward toward outside.

* * * * *